United States Patent [19]

Robeson et al.

[11] Patent Number: 4,598,130

[45] Date of Patent: Jul. 1, 1986

[54] BLENDS OF A POLYARYLATE AND A POLY(ESTER CARBONATE)

[75] Inventors: Lloyd M. Robeson, Whitehouse Station, N.J.; Donald M. Papuga, Danbury, Conn.

[73] Assignee: Union Carbide Corporation, Danbury, Conn.

[21] Appl. No.: 732,817

[22] Filed: May 10, 1985

Related U.S. Application Data

[63] Continuation of Ser. No. 468,086, Feb. 18, 1983, abandoned.

[51] Int. Cl.$^4$ .................. C08L 67/02; C08L 69/00
[52] U.S. Cl. ..................... 525/439; 525/133; 525/146; 525/148
[58] Field of Search ............................. 525/439

[56] References Cited

U.S. PATENT DOCUMENTS

| | | | |
|---|---|---|---|
| 3,169,121 | 2/1965 | Goldberg | 528/194 |
| 3,792,115 | 2/1974 | Kishikawa | 525/439 |
| 4,156,069 | 5/1979 | Prevorsek | 528/176 |
| 4,189,549 | 2/1980 | Matsunaga | 525/439 |
| 4,226,961 | 10/1980 | Motz | 525/439 |
| 4,259,458 | 3/1981 | Robeson | 525/439 |
| 4,286,075 | 8/1981 | Robeson | 525/439 |
| 4,321,355 | 3/1982 | Maresca | 528/176 |
| 4,349,658 | 9/1982 | Mark | 525/439 |
| 4,358,568 | 11/1982 | Fox | 525/439 |

OTHER PUBLICATIONS

Olabisi, O., Polymer-Polymer Miscibility, p. 120, New York, 1979.

*Primary Examiner*—John C. Bleutge
*Assistant Examiner*—Patricia Short
*Attorney, Agent, or Firm*—D. M. Papuga

[57] ABSTRACT

Described herein are blends comprising a polyarylate and a poly(ester carbonate). These blends have improved light transmission, lower haze, and good mechanical properties.

2 Claims, No Drawings

BLENDS OF A POLYARYLATE AND A POLY(ESTER CARBONATE)

This application is a continuation of prior U.S. application Ser. No. 468,086, filed Feb. 18, 1983, now abandoned.

Described herein are blends comprising a polyarylate and a poly(ester carbonate). These blends have improved light transmission and lower haze than comparable blends of polyarylate and polycarbonate.

Polyarylates are polyesters derived from a dihydric phenol, particularly 2,2-bis(4-hydroxyphenyl)propane also identified as bisphenol-A, and an aromatic dicarboxylic acid, particularly mixtures of terephthalic and isophthalic acids. These polyarylates are high temperature, high performance thermoplastic polymers with a good combination of thermal and mechanical properties. They also have good processability which allows them to be molded into a variety of articles.

U.S. Pat. No. 3,792,115 describes blends of 1 to 99 percent by weight of a polycarbonate and 99 to 1 percent by weight of a polyarylene ester, i.e., polyarylate. The patent states that the impact strength and the heat deformation resistance of the polycarbonate is improved by the addition of the polyarylene ester. However, blends of polycarbonate and polyarylates do not have acceptable light transmission, and also, have high haze, which is not acceptable in some end use applications. The only method by which transparency can be achieved in the polycarbonate-polyarylate blend is to process the blend at a temperature high enough to promote sufficient ester-exchange to yield a block copolymer. The use of the higher temperature may result in increased color and poorer thermal and hydrolytic stability.

DESCRIPTION OF THE INVENTION

It has now been found that when a polyarylate is blended with a poly(ester carbonate), the blend has better light transmission and lower haze than a blend of polyarylate and polycarbonate. Also higher temperature stiffness is improved with the blend of polyarylate and poly(ester carbonate) as compared to a blend of polyarylate and polycarbonate. Further, the blend of polyarylate and poly(ester carbonate) has good mechanical properties.

The polyarylates which are suitable for use in this invention are derived from a dihydric phenol and at least one aromatic dicarboxylic acid and have a reduced viscosity of from about 0.4 to greater than about 1.0, preferably from about 0.6 to about 0.8 dl/gm, as measured in chloroform (0.5 g/100 ml chloroform) or other suitable solvent at 25° C.

A particularly desirable dihydric phenol is of the following formula:

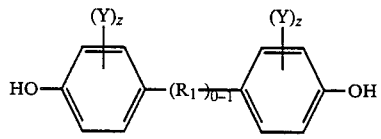

wherein Y is selected from alkyl groups of 1 to 4 carbon atoms, chlorine or bromine, each z, independently, has a value of from 0 to 4, inclusive, and $R_1$ is a divalent saturated or unsaturated aliphatic hydrocarbon radical, particularly an alkylene or alkylidene radical having from 1 to 6 carbon atoms, or a cycloalkylidene or cycloalkylene radical having up to and including 9 carbon atoms, O, CO, $SO_2$, S, or a direct bond. The dihydric phenols may be used individually or in combination, or in combination with hydroquinone and/or resorcinol.

The aromatic dicarboxylic acids that may be used in this invention include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents, such as halides, alkyl or aryl ethers, and the like. Hydroxybenzoic acid can also be used. Preferably, mixtures of isophthalic and terephthalic acids are used. The isophthalic acid to terephthalic acid ratio in the mixture is about 10:90 to about 100:0, while the most preferred acid ratio is about 75:25 to about 25:75. Also, from about 0.5 to about 20 percent of aliphatic diacids containing from 2 to about 10 carbon atoms, such as adipic acid, sebacic acid, and the like may be additionally used in the polymerization reaction.

The polyarylates of the present invention can be prepared by any of the well known prior art polyester forming reactions, such as the reaction of the acid chlorides of the aromatic dicarboxylic acids with the dihydric phenols; the reaction of the diaryl esters of the aromatic dicarboxylic acids with the dihydric phenols; or the reaction of the aromatic diacids with diester derivatives of the dihydric phenol. These processes are described in for example, U.S. Pat. Nos. 3,317,464; 3,948,856; 3,780,148; 3,824,213; and 3,133,898.

The polyarylates are preferably prepared by the process described in U.S. Pat. No. 4,321,355. This patent describes an improved process for preparing a polyarylate having a reduced viscosity of from about 0.5 to greater than 1.0 dl/gm comprising the following steps:

(a) reacting an acid anhydride derived from an acid containing from 2 to 8 carbon atoms with at least one dihydric phenol to form the corresponding diester; and (b) reacting said diester with at least one aromatic dicarboxylic acid at a temperature sufficient to form the polyarylate, wherein the improvement comprises removing residual acid anhydride after formation of the dihydric phenol diester so that its concentration is less than about 1500 parts per million.

The poly(ester carbonate)s suitable for use in this invention are well known in the art. They generally contain carbonate groups, carboxylate groups and aromatic carbocyclic groups in the polymer chain, in which at least some of the carboxylate groups and at least some of the carbonate groups are bonded directly to ring carbon atoms of the aromatic carbocyclic groups.

These poly(ester carbonates) are in general prepared by reacting bifunctional carboxylic acid or a reactive derivative of the acid such as the acid dihalide, a dihydric phenol, a carbonate precursor and a monofunctional molecular weight regulator or chainstopper.

The dihydric phenols that can be employed in the practice of this invention are bisphenols such as bis(4-hydroxyphenyl) methane, 2,2-bis(4-hydroxyphenyl)-propane (bisphenol-A) 2,2-bis(4-hydroxy-3-methylphenyl) propane, 4,4-bis(4-hydroxyphenyl) heptane, 2,2-bis(4-hydroxy-3,5-dichlorophenyl) propane, 2,2-bis(4-hydroxy-3,5-dibromophenyl) propane, etc.; dihydric phenol ethers such as bis(4-hydroxyphenyl) ether, bis(3,5-dichloro-4-hydroxyphenyl) ether, etc.; dihydroxydiphenyls such as p,p'-dihydroxydiphenyl, 3,3'-dichloro-4,4-dihydroxydiphenyl, etc.; dihydroxyaryl sulfones such as bis(4-hydroxyphenyl) sulfone, bis(3,5-dimethyl-4-hydroxyphenyl)sulfone, etc.; dihydroxy benzenes, resorcinol, hydroquinone, halo- and alkylsubstituted dihydroxy benzenes such as 1,4-dihydroxy2,5-dichlorobenzene, 1,4-dihydroxy-3-methylbenzene, etc.; and dihydroxy diphenyl sulfoxides such as bis(4-hydroxyphenyl) sulfoxide, bis(3,5-dibromo-4-hydroxyphenyl) sulfoxide, etc. A variety of additional dihydric phenols are also available such as are disclosed in U.S. Pat. Nos. 2,999,835; 3,028,365 and 3,153,008. Also suitable are copolymers prepared from the above dihydric phenols copolymerized with halogen-containing dihydric phenols such as 2,2-bis(3,5-dichloro-4-hydroxyphenyl) propane, 2,2-bis(3,5-dibromo-4-hydroxyphenyl) propane, etc. It is also possible to employ two or more different dihydric phenols or a copolymer of a dihydric phenol with a glycol or with hydroxy or acid terminated polyester, or with a dibasic acid as well as blends of any of the above materials.

The acid dichlorides that can be employed are both the aromatic and the saturated aliphatic dibasic acids. The saturated, aliphatic dibasic acids are derived from straight chain paraffin hydrocarbons, such as oxalic, malonic, dimethyl malonic succinic, glutaric, adipic, pimelic, suberic, azelaic and sebacic acid and the halogen-substituted aliphatic dibasic acids. Aliphatic carboxylic acids containing hetero atoms in their aliphatic chain, such as thio-diglycollic or diglycollic acid can also be used as well as unsaturated acids such as maleic or fumaric.

Suitable examples or aromatic and aliphatic aromatic dicarboxylic acids which can be used are phthalic, isophthalic, terephthalic, o-phthalic, o-, m-, and p-phenylenediacetic acid; the polynuclear aromatic acids such as diphenic acid, and 1,4-naphthalic acid. Preferred acid dichlorides are isophthaloyl dichloride (IPCl$_2$), and terephthaloyl dichloride (TPCl$_2$) as well as mixtures thereof. When mixtures of IPCl$_2$ and TPCl$_2$ are employed, they are preferably present at a IPCl$_2$:TPCl$_2$ weight ratio in the range of about 5-95:95-5.

The random copolyester-carbonates of the invention can be prepared by well known processes such as by interfacial polymerization or phase boundary separation, transesterification, and the like. These processes typically include dissolving the reactants in a suitable solvent medium under controlled pH conditions and in the presence of a suitable catalyst and acid acceptor and then contacting these reactants with a carbonate precursor. A molecular weight regulator; i.e., chainstopper, is generally added to the reactants prior to contacting them with a carbonate precursor.

The acid acceptor employed can be either an organic or an inorganic acid acceptor. A suitable organic acid acceptor is a tertiary amine and includes such materials as triethylamine, dimethylaniline, tributylamine, etc. The inorganic acid acceptor can be one which can be either a hydroxide, a carbonate, a bicarbonate, or a phosphate of an alkali or alkaline earth metal.

The carbonate precursor employed can be either a carbonyl halide, a carbonate ester or a haloformate. The carbonyl halides which can be employed are carbonyl bromide, carbonyl chloride and mixtures thereof. Typical of the carbonate esters that can be employed are diphenyl carbonate, di-(halophenyl) carbonates such as di-(chlorophenyl) carbonate, di-(bromophenyl) carbonate di-(trichlorophenyl) carbonate, di-(bromophenyl) carbonate, di-(trichlorophenyl) carbonate, di-(tribromophenyl) carbonate, etc., di(alkylphenyl) carbonate such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bishaloformates of dihydric phenols (bis-chloro-formates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid such as are disclosed in U.S. Pat. No. 3,169,121 which is incorporated herein by reference.

The catalysts which can be employed can be any of the suitable catalysts that aid the polymerization of the bisphenol-A with the acid dichloride and with phosgene. Suitable catalysts include tertiary amines such as triethylamine, tripropylamine, N,N-dimethylaniline, quarternary ammonium compounds such as tetraethylammonium bromide, cetyl triethylammonium bromide, tetra-n-heptylammonium iodide, tetra-n-propylammonium bromide, tetramethylammonium chloride, and quaternary phosphonium compounds such as n-butyltriphenyl phosphonium bromide and methyltriphenyl phosphonium.

The solvent system employed is one in which the reactants can be accepted but which is inert with respect to the reactants. For example, an aqueous organic solvent system can be employed wherein the organic member can readily accept the reactants, but be inert to them. Exemplary of such organic members are methylene chloride, chlorobenzene, cyclohexanone, carbon tetrachloride, and the like. Preferably, the organic portion of the solvent system is methylene chloride.

Also included herein are branched copolyester-carbonates wherein a polyfunctional aromatic compound is reacted with the dihydric phenol, the carbonate precursor and the acid dichloride to provide a thermoplastic randomly branched copolyester-carbonate. These polyfunctional aromatic compounds contain at least three functional groups which are carboxyl, carboxylic anhydride, haloformyl or mixtures thereof. Examples of these polyfunctional aromatic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimestic acid, benzophenonetetracarboxylic acid, benzophenonetetracarboxylic anhydride, and the like. Preferred polyfunctonal aromatic compounds are trimellitic anhydride or trimellitic acid, or their haloformyl derivatives.

Also included herein are blends of a linear and a branched copolyester-carbonate.

The molecular weight regulators or chainstoppers that can be employed in the reaction of this invention include monohydric phenols, primary and secondary amines, etc. A preferred example of this is represented by the formulae:

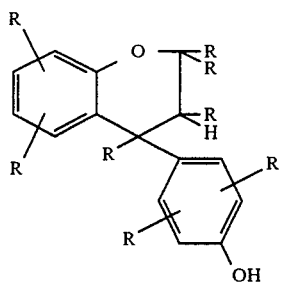

wherein R is H or alkyl radicals.

Other preferred chainstoppers include p-cumylphenol, p-tritylphenol and p-phenylphenol.

Of the foregoing chainstoppers, chroman-I of the chromanyl group and p-tertbutyl phenol are most preferred and they have the following structures:

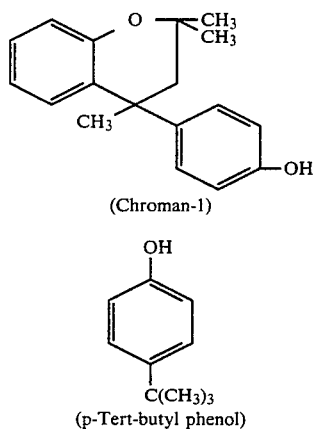

(Chroman-1)

(p-Tert-butyl phenol)

Preferably, the random copolyester carbonates of the invention are obtained by reacting a dihydric phenol, an acid dichloride and a phenol in a suitable solvent system at a pH level of about 8–11; then a carbonate precursor is added and the pH adjusted to a level of about 9–12; and, the addition of the carbonate precursor is contained until the reaction is completed.

Regardless of which process is employed, it is important that the solvent system employed be free of pyridine as it has been found that pyridine cannot be removed from the end product. The presence of pyridine in the copolyester-carbonate results in a product wherein such properties as color, thermal aging melt stability, and the like, are not satisfactory.

The ester/carbonate molar ratio may be in the range of from about 0.1:0.9 to 0.9:0.1.

Additionally, the poly(ester carbonate) described in U.S. Pat. No. 4,156,069 may be used herein. This patent describes the poly(ester carbonate) as containing bisphenol A, terephthaloyl chloride and carbonate moieties in the mole range of from 2:0.9:1.1 to 2:1.2:0.8 and have viscosity numbers in the range of 0.6 to 1 dl/gm and a glass transition temperature of at least 178° C. This patent describes the poly(ester carbonate) as being prepared by the following procedure:

(1) terephthaloyl chloride is admixed with bisphenol-A at about 2:1 mol ratio of bisphenol-A:terephthaloyl chloride, in solution in a reaction medium of pyridine and chlorinated organic solvent which medium is capable at from 1:3 to 10:1 volume ratio of chlorinated solvent:pyridine, of dissolving low molecular weight bisphenol-A/terephthalate polyesters and dissolving or colloidally dispersing the final polymer; said reaction medium containing at least a small excess but not more than a 14-fold excess of pyridine over the theoretically required pyridine to combine with the theoretical amount of hydrogen chloride produced in production of the polymer;

(2) the reaction of terephthaloyl chloride and BPA is carried out at temperature not above 35° C;

(3) thereafter a phenolic compound to serve as molecular weight regulator is added to the reaction mixture;

(4) then phosgene is introduced into the resulting reaction mixture;

(5) when a predetermined viscosity of the product is reached, addition of phosgene is terminated; and (6) then a further quantity of phenolic compound is added as chain terminator.

The preferred poly(ester carbonate) as described in U.S. Pat. No. 4,156,069 has the following structure:

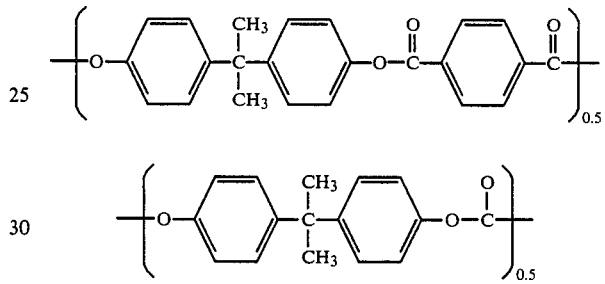

The polyarylate is used in the blend in amounts of from about 10 to about 90, preferably from about 80 to about 40 weight percent, and the poly(ester carbonate) in amounts of from about 90 to about 10, preferably from about 20 to about 60 weight percent.

Other additives may be included in the blend of this invention. These additives include plasticizers; pigments; flame retardant additives such as aromatic sulfonic acid salts; reinforcing agents; thermal stabilizers, processing aids and the like.

In a preferred embodiment of this invention the blend may include from about 5 to about 50 weight percent of one or more mechanically compatible thermoplastic polymers such as a polyetherimide, a polyester polymer such as poly(ethylene terephthalate), an aromatic polycarbonate, a styrene polymer, an alkyl acrylate polymer, a polyurethane, a vinyl chloride polymer, a poly(aryl ether), a copolyetherester block polymer, a polyhydroxyether, and the like, or combinations thereof.

EXAMPLES

The following examples serve to give specific illustrations of the practice of this invention but they are not intended in any way to limit the scope of this invention.

CONTROL A 50 weight percent of a polyarylate (prepared from bisphenol A and a mixture of 50 mole percent of terephthalic acid chloride and 50 mole percent of isophthalic acid chloride by conventional methods) having a reduced viscosity of 0.66 as measured in p-chlorophenol at 49° C. and 50 weight percent of an aromatic bisphenol-A polycarbonate (Lexan 101 obtained from General Electric Company) having a reduced viscosity of 0.64 as measured in chloroform at 25° C. was blended in a Brabender blender at 270° C. The blend was compression molded in a Hydrolair Press at 270° C. into 4×4 inch, 20 to 30 mil samples. The samples were measured for the following properties: tensile strength and modulus according to a procedure similar to ASTM D-638; elongation at break according to a procedure similar to ASTM D-638; notched izod impact strength; according to ASTM D-256; heat distortion temperature according to ASTM D-648; pendulum impact strength (pendulum impact strength was measured as follows: A steel pendulum was used, cylindrical in shape with a diameter of 0.85 inch and weighing 1.562 pounds. The striking piece, mounted almost at the top of the pendulum was a cylinder 0.3 inch in diameter. Film specimens, 4 inches long, 0.125 inch wide and about 1 to 30 mils thick were clamped between the jaws of the tester so that the jaws were spaced 1 inch apart. The 0.125 inch width of the film was mounted vertically. The pendulum was raised to a constant height to deliver 1.13 foot pounds at the specimen. When the pendulum was released the cylindrical striking piece hit the specimen with its flat end, broke the film, and traveled to a measured height beyond. The difference in the recovery height (i.e., the difference in the potential energy of the pendulum at the maximum point of the upswing) represents the energy absorbed by the specimen during rupture. The impact strength, expressed in foot-pounds per cubic inch, is obtained by dividing the pendulum energy loss by the volume of the specimen); glass transition temperature (Tg) according to method of resilience; described in "Polymer-Polymer Miscibility", Olabisi, et al. p. 126, Academic Press, New York, 1979; light transmission according to ASTM-D-1003; and haze according to ASTM D-1003.

The results are shown in tne Table.

EXAMPLE 1

30 weight percent of the polyarylate of Control A was blended with 70 weight percent of a poly(ester carbonate) inherent viscosity (60/40 phenol/tetrachloroethane) of 0.50 of the following formula:

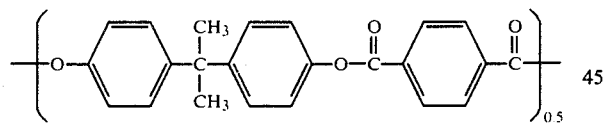

-continued

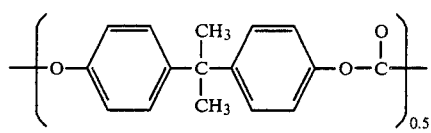

was prepared and tested by the procedure described in Control A.

The results are shown in the Table.

EXAMPLE 2

50 weight percent of the polyarylate of Control A was blended with 50 weight percent of the poly(ester carbonate) of Example 1 by the procedure described in Control A. The blend was tested as described in Control A. The results are shown in the Table.

EXAMPLE 3

70 weight percent of the polyarylate of Control A was blended with 30 weight percent of the poly(ester carbonate) of Example 1 by the procedure described in Control A. The blend was tested as described in Control A.

The results are shown in the Table.

EXAMPLE 4

50 weight percent of the polyarylate of Control A was blended in an extruder at 270° C. with 50 weight percent of a poly(ester-carbonate) which had an ester/carbonate molar ratio of 87/13, a terephthalic/isophthatic ratio of 73/27, and a reduced viscosity of 0.57 as measured in chloroform at 25° C. (0.5g/100 ml). The resultant product was pelletized and injection molded into test specimens. The test specimens were transparent and had the following properties:

| Tensile Modulus (psi) | 325,000 |
| --- | --- |
| Tensile Strength (psi) | 9,440 |
| Elongation (%) | 48 |
| Notched Izod Impact Strength (ft-lbs/in. of notch) | 3.3 |
| Heat Distortion Temperature (°C.) (⅛ inch bar unannealed). | 162 |

TABLE

| Example | Description of the Composition Polymer[1] | (wt. %) | Secant Modulus (psi) | Tensile Strength (psi) | Elongation (%) | Pendulum Impact Strength (ft-lbs/in$^3$) | Tg (°C.) | Light Transmission | Haze[2] | T$_5$[3] (°C.) | T$_4$[4] (°C.) |
| --- | --- | --- | --- | --- | --- | --- | --- | --- | --- | --- | --- |
| Control A | PA | 50 | 183,000 | 7,130 | 58 | 258 | 155,190 | 76.6 | 29.4 | 151 | 172 |
|  | PC | 50 |  |  |  |  |  |  |  |  |  |
| 1 | PA | 30 | 182,000 | 7,290 | 23 | 253 | 180 | 86.0 | 11.5 | 170 | 181 |
|  | PEC | 70 |  |  |  |  |  |  |  |  |  |
| 2 | PA | 50 | 175,000 | 7,360 | 21 | 241 | 180 | 83.9 | 3.7 | 170 | 182 |
|  | PEC | 50 |  |  |  |  |  |  |  |  |  |
| 3 | PA | 70 | 183,000 | 7,520 | 26 | 230 | 190 | 83.6 | 15.0 | 179 | 192 |
|  | PEC | 30 |  |  |  |  |  |  |  |  |  |

[1]PA = polyarylate
PC = polycarbonate
PEC = poly(ester carbonate)
[2]Determined on a 30 mil thick specimen
[3]Modulus = 100,000 psi
[4]Modulus = 10,000 psi

What is claimed is:

1. A blend consisting essentially of from about 30 to about 70 weight percent of a polyarylate prepared from bisphenol-A and a mixture of terephthalic and isophthalic acids and from about 70 to about 30 weight percent of a random poly(ester carbonate) of the following formula:
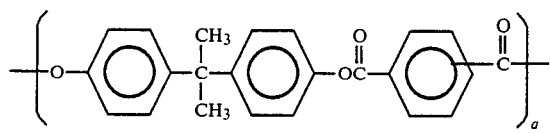
-continued
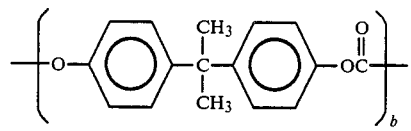
wherein a is from about 0.1 to about 0.9 and b is from about 0.9 to about 0.1.
2. A blend as defined in claim 1 wherein a and b are 0.5.
* * * * *